United States Patent [19]

Frost

[11] Patent Number: 5,018,277
[45] Date of Patent: May 28, 1991

[54] ANGLE SETTING DEVICE

[76] Inventor: Blair A. Frost, P.O. Box 213, Clinton, Me. 04927

[21] Appl. No.: 487,136

[22] Filed: Mar. 2, 1990

[51] Int. Cl.$^5$ .............................................. G01B 3/50
[52] U.S. Cl. ..................................................... 33/538
[58] Field of Search ................. 33/536, 537, 538, 573, 33/568, 569, 570, 534; 269/69, 79

[56] References Cited

U.S. PATENT DOCUMENTS

| | | |
|---|---|---|
| 2,366,385 | 1/1945 | Comfort . |
| 2,567,517 | 9/1951 | Keebler ............................ 33/537 X |
| 3,166,853 | 1/1965 | Marcus ................................. 33/537 |
| 3,736,666 | 6/1973 | Sutter ................................... 33/570 |
| 3,848,865 | 11/1974 | Bird . |

Primary Examiner—Harry N. Haroian

[57] ABSTRACT

A device is disclosed where, for various purposes, a substantial range of the angular relationship between two flat surfaces must be quickly, easily and accurately established and maintained. The device has three component corresponding ends of which are interconnected by a common pivot with each of the first and second members having one of the flat surfaces. The first and third members are detachably interconnected in a series of angle establishing position increasing from a zero position by regular increments in the disclosed embodiment of the invention, of one degree to a maximum of nine degrees. The second and third components are detachably interconnected in a like manner providing a zero position and a series of angular relationships increasing by an increment, in the disclosed embodiment, of 10° to a maximum of forty degrees. In both cases, the detachable connections consist of a series of bores through selected, aligned bores of which a holding member, a bolt in the disclosed embodiment is inserted. When both zero positions are established, both surfaces are parallel as the selected polar starting position. In the disclosed embodiment, fractions of degrees are established by clamping the third component to the first component in a manner enabling the former to pivot relative to the axis of the pivot through an arc of ten degrees with the connection between the second and third set at zero position or whatever angular relationship is wanted and with the wanted fraction of a degree determined by the use of a sine bar or other precision angle measuring device held against the flat surface of the second component.

13 Claims, 1 Drawing Sheet

ANGLE SETTING DEVICE

BACKGROUND OF THE INVENTION

The need for a self-contained angle setting device is well illustrated by the common requirement in machine shops of supporting a work piece at a predetermined angle for a further operation.

While there are presently angle work holding systems available for setting precise angles between two surfaces they are not generally self-contained. A common practice is to set a wanted angle with a sine bar and gauge blocks. These systems are very time consuming and require much training; they also lack the rigidity required for many machining applications, therefore requiring extra roughing cuts, and yielding poor surfaces finishes. Stability is also a problem, the tool body is subject to move especially when downward pressure is applied to the work piece, as in the case when a hole or holes are being drilled in it.

Whether for such or other uses, the requirement is for an angle setting device which enables a wide range of angular relationships between its two surfaces to be established quickly and maintained positively during use from indicia with which the device is permanently marked.

THE PRESENT INVENTION

The general objective of the present invention is to provide a self-contained device for use in the many applications where precise angular settings between first and second straight surfaces must be precisely established and positively maintained.

In accordance with the invention, that objective is attained with an angle setting device consisting of first, second and third components which have first and second ends with their first ends interconnected by a common pivot. The bottom surface of the first component and the top or opposite surface of the second component are the two surfaces the angles between which are to be accurately established.

The first and third components are detachably interconnected by first means in a series of positions resulting in the pivoting of the third component relative to the first component to establish from a first or zero position, a range of angular relationships between them increasing in regular increments to a maximum. The second and third components are interconnected by second means in a like manner but with the series of angular relationships between them resulting in the pivoting of the second component relative to the first and third components increasing from a zero position to a maximum by increments each of which is equal to the maximum of the increments permitted by the first named series of positions plus one additional such increment. When both connecting means are in their zero positions, the two surfaces are in a designated polar starting position which in the disclosed embodiment is one in which the surfaces are parallel.

In both cases, the connecting means consist of series of transverse holes or bores in the two components to be interconnected. Selected bores, when aligned, are held in place by a connector preferably of a type which can be locked in place while the resulting angular setting is to be maintained.

A wanted angular setting may include a fraction of a degree. In order to enable such a setting to be made, an alternate connection between the first and third components enables them to be clamped together in a range of positions equal to an increment of the second means. For that purpose, third and first components are interconnected through a slot which is arcuate with respect to the pivot axis and is of the required arcuate extent. With the second means appropriately adjusted and with a sine bar or other precision angle measuring device seated on the second surface, the third component is easily correctly positioned and then clamped in place.

Other objectives of the invention and the manner of their attainment will be apparent from the drawings, the following description thereof and appended claims.

BRIEF DESCRIPTION OF THE DRAWINGS

The accompanying drawings illustrate the invention embodied as a device provided with a work support adjustable into wanted angular relationships relative to its base

THE PREFERRED EMBODIMENT

Figure 1:
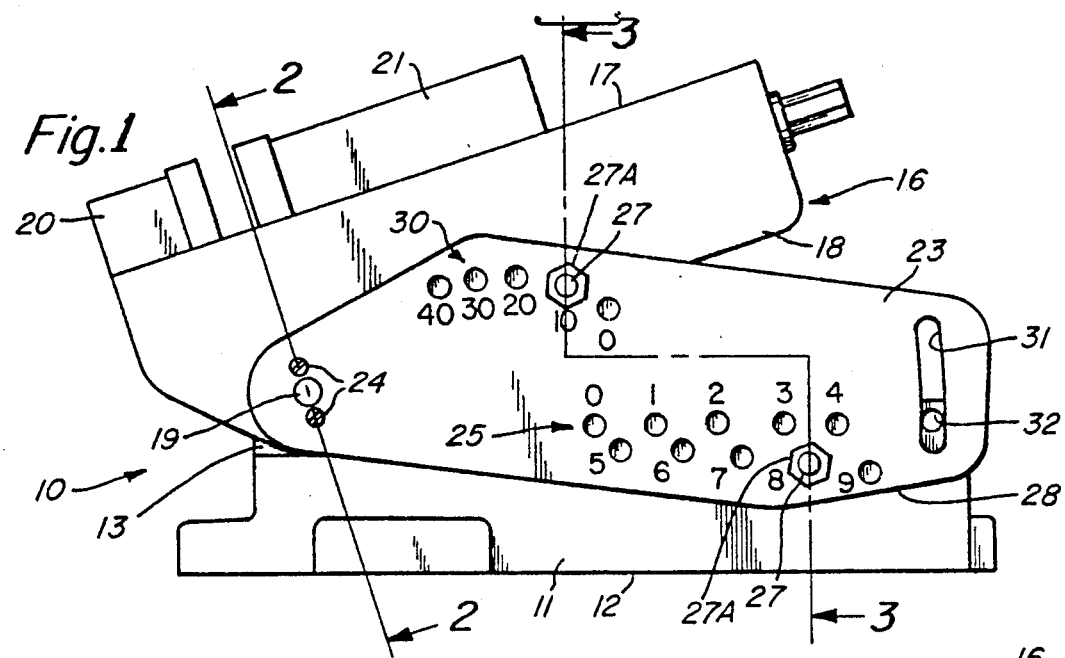
FIG. 1 is a side view of the device.
Figure 2:
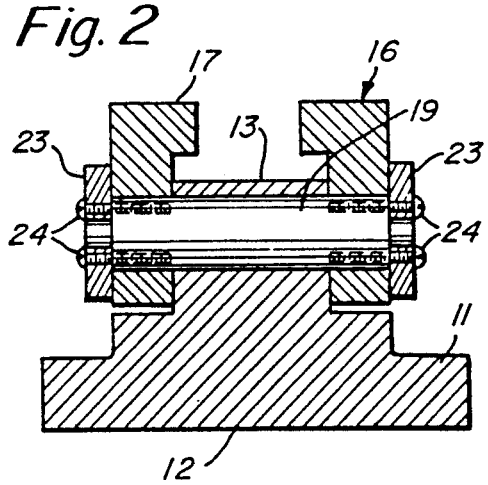
FIG. 2 is a section taken approximately along the indicated line 2—2 of FIG. 1.
Figure 3:
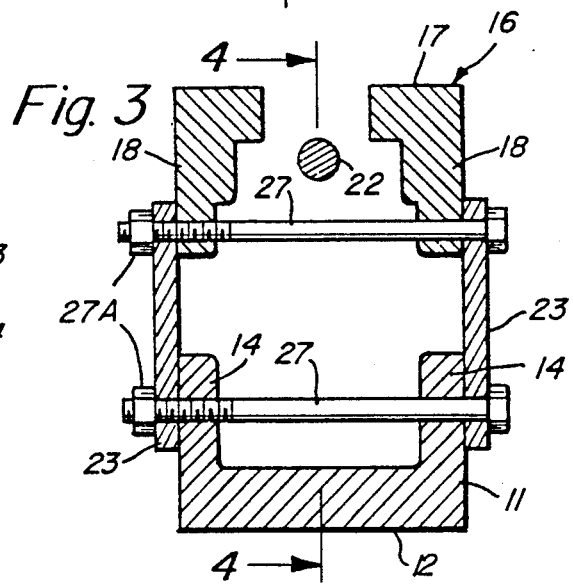
FIG. 3 is a section taken substantially along the indicated line 3—3 of FIG. 1.

The device illustrated by the drawings is generally indicated at 10 and has, as its first component, a base 11, the bottom or supporting surface 12 of which is flat. The base 11 has a boss 13 at one end, hereinafter called, the first end, forwardly of which the base 11 is U-shaped in cross section thus establishing side walls 14 extending substantially to the other or second end of the base. The side walls 14 have transversely aligned series of ten bores 15 which are of the same diameter and are evenly spaced along a line parallel to the bottom surface 12 and below the boss 13. The series of bores 15 are for use in effecting angular adjustments by units representing single degrees in a manner later detailed.

A second component 16 is U-shaped in cross section and is positioned with its flat surface 17 uppermost and its side walls 18 depending in vertical alignment with the side walls 14 of the base 11. The side walls 18 are shown as interconnected by a reenforcing rib 18A. One end, sometimes called the first end, of the second component, is pivotally connected to the first end of the base 11 by a pivot 19 extending through the boss 13. Work clamping means are supported on the flat surface 17 and are shown as consisting of a fixed jaw 20 and a moveable jaw 21 moved into or out of clamping engagement with a work piece, not shown, resting on the surface 17. Movements of the jaw 21 are conventionally effected by means of a captive threaded member 22 extending lengthwise of the second component with one end exposed at its second end to be engaged and turned in one direction or the other to clamp a work piece in place or to release it.

A third component of the device consists, in the disclosed embodiment, of a pair of side walls or side plates 23, corresponding ones of their ends, sometimes called their first ends, are fitted on the ends of the pivot 19 which are of reduced diameter to enable the fitted ends to be anchored to the pivot 19 by screws 24 with the anchored ends held against the sides of the second component 16.

The device 10, as thus far described, enables the second and third components to be pivoted relative to the first component and to each other with the angle between the flat surfaces 12 and 17 variable. The manner in which wanted angular relationships between those surfaces are established and maintained will now be detailed.

The series of ten bores 15 in the side walls 14 of the base 11 are, as is apparent from FIG. 1, concealed by the side plates 23. The series of bores 15 are used in establishing angular relationships between the base 11 and the side plates 23 from zero to nine degrees and may be regarded, accordingly, as so numbered from left to right as viewed in FIG. 4.

The side plates 23 have a first series of permanently marked bores 25, see FIG. 1, providing an upper row numbered, reading left to right, 0, 1, 2, 3 and 4 and a lower row numbered from left to right 5, 6, 7, 8 and 9. The series of bores 25 are so accurately ralated to a theoretical center line L of the side plates 23 in a manner such that a bolt 27, which is a precise fit in the bores of the series 15 and 25 can be inserted through only the selected aligned bores of the series 25 when those bores are also in alignment with the appropriate one of the bores of the series 15. The bolt 27 is typically provided with nut 27A so that it can be locked in place. Thus, when a bolt is to extend through the "zero" bores of the third component, the only bores of the series 15 available are the ones functioning as the zero bores. When the first and third components are thus interconnected, the second ends of the side plates 23 are in their lowest position with their bottom edges inclined as at 28 so as not then to extend below the bottom surface 12 of the base 11. When other bores of the side wall series 25 are to be interconnected through bores of the series 15 of the base 11, for example, the number 8 bores, the bolt 27 can be extended only through the corresponding bores of the series 15. Assuming the first and second flat surfaces 12 and 17 have been parallel, their angular relationship will now be 8°.

It will be noted that the side walls 18 of the second component and the side walls 14 of the base 11 are in vertical alignment. When they are in mutual contact, the surfaces 12 and 17 are at least approximately parallel. The walls 14 of the base 11 are limited to that portion adjacent the second end thereof required for the series of bores 15 and the side walls 18 are so shaped and dimensioned as to accommodate the side walls 14.

Figure 4:
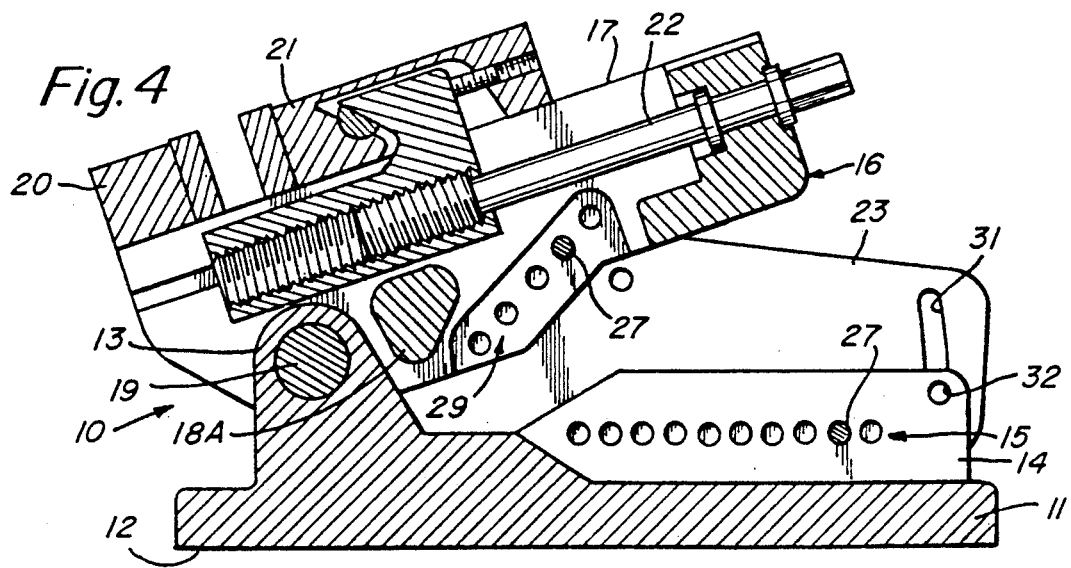
FIG. 4 is a section taken approximately along the indicated line 4—4 of FIG. 3.

In the intermediate portions of the side walls 18, see FIG. 4, there are series of five bores 29, preferably of the same diameter as the bores of the previously discussed series. These are equally spaced in a line defining an angle of 30° with respect to the flat surface 17 with the transversely aligned bores nearest the second end of the second component 16 spaced the closest to that surface and serve as the first or zero bores with the other bores of the series 29 spaced apart to establish equal increments of angular changes.

The side plates comprising the third component have a second series 30 of five transversely alignable bores which are of the same diameter as those of the other series and are arranged in a curved row with the space between each two bores decreasing in a manner such that each two successive bores represents an increment of precisely 10° and the bores of the series 30 are, accordingly, permanently marked 0, 10, 20, 30 and 40. Assuming the side plates 23 and the base 11 to have been connected to establish a zero angular relationship, the surfaces 12 and 17 are parallel if the second component and the side plates are interconnected by another like bolt 27 through zero bores of the series 29 and 30. Whichever ones of the five bores of the series 30 represent the wanted angle or the angle nearest the wanted angle, the bore 10, for example, between the two surfaces can only be interconnected through the holes of the series 29 which will establish that angular relationship.

From the foregoing, it will be apparent that any selected angle between 0° and 49° can be quickly and accurately established between the surfaces 12 and 17 and that with the base and side plates interconnected to establish an 8° setting, it will be apparent from the numbered bores, that the established angle is 18°.

In the event an angular relationship between those surfaces is or includes a fraction of a degree, such can be established. To that end, the side plates 23 have, adjacent their second ends transversely aligned slots 31 which are arcurate with respect to the axis of the pivot 19. The walls 14 of the base 11 have transversely aligned bores 32 dimensioned to receive a bolt 27 which enables the side plates to be clamped to those of the base. Assuming that the second component and the side plates are to be interconnected to establish a wanted angular relationship of twenty two and one half degrees, the twenty degree setting would be established as previously described. The slots 31 are of an arcurate extent such as to enable any angle or fraction thereof between zero and ten degrees to be established. With a bolt 27 extending through the slots 31 and bores 32, a sine bar or other precision angle measuring device (not shown) is set to the wanted angular relationship and is then clamped against the surface 17 and the second component is then pivoted counter clockwise until the top of the sine bar and the surface 12 are parallel. The nut on the bolt 27 is then tightened to lock the side plates 23 to the base 11 with the thus established setting providing the two and one half degrees required to bring the angular relationship between the surfaces 12 and 17 to the wanted twenty two and one half degrees.

It will be appreciated that angular relationships in whole degrees cannot only be quickly and accurately effected with set angular relationships positively maintained but also the set angles are visually indicated on the side walls.

I claim:

1. A device for establishing predetermined angular relationships between two opposite flat surfaces, said device comprising first, second and third components each of which has first and second ends, a pivot interconnecting the first ends of said components, the first component having the first flat surface and the second component having the second flat surface, first manually adjustable means detachably connecting the first and third components in a plurality of different positions ranging from a zero position by uniform increments to a maximum number thereof and second manually adjustable means detachably connecting the second and third components in a plurality of different positions ranging from a zero position by uniform increments to a maximum number thereof, when both adjustable detachable means are in zero positions, said two surfaces are in a predetermined, polar starting position and in any other position of either position of said means, a particular, predetermined angular relationship between said surfaces is established, the increments established by the second adjustable means equal to the first next whole number which represents the total of the first increments plus one additional such increment.

2. The device of claim 1 in which the two surfaces are parallel in the starting position.

3. The device of claim 1 in which the increments of the first manually adjustable connecting means are single angular degrees and the increments of the second manually adjustable means are angular degrees in double digits.

4. The device of claim 1 in which there is an alternate, manually adjustable means detachably connecting the first and third components for infinite adjustments along a path arcuate with respect to the pivot axis and operable to divide an increment of the second adjustable means into wanted fractions thereof.

5. The device of claim 3 in which the third component is provided with permanent indicia designating the numerical value in terms of degrees established by each position of the two manually adjustable means.

6. The device of claim 1 in which the first and second components include vertically aligned side walls disposed towards each other, the third component comprises side plates, the first connecting means includes a series of transversely aligned bores extending through both side walls of the first component parallel to the first surface and below the pivot axis, the side plates have a first series of transversely alignable bores, and a connecting member dimensioned to interconnect corresponding bores of the side plates through the aligned bores of the first component which will establish a wanted angular relationship between the side plates and the first component and the second connecting means includes a series of transversely aligned bores extending through the second component, a second series of transversely alignable bores in the side plates and a connecting member dimensioned to extend through and interconnected corresponding bores of the side plates through the aligned bores of the second component which will establish a wanted angular relationship between the side plates and the second component.

7. The device of claim 6 in which the two surfaces are parallel is the starting position.

8. The device of claim 6 in which the increments of the first connecting means are single angular degrees and the increments of the second connecting means are angular degrees in double digits.

9. The device of claim 8 in which the third component is provided with permanent indicia designating the numerical value in terms of degrees established by each position of the two connecting means.

10. The device of claim 6 in which the bores of the two connecting means are so spaced and arranged that when either connecting member is to be employed to establish a wanted angular relationship by the appropriate one of the connecting means, through aligned bores, no other bores of that connecting means are in alignment.

11. The device of claim 6 in which the series of bores in the second component are in a straight row defining an angle of 30° with respect to the second surface and the second series of bore in the side plates are so spaced and arranged relative to the straight row of bores that whenever corresponding bores of the side plates are aligned with bores of the straight row, other bores of the second series and of the straight rows are in alignment.

12. The device of claim 6 in which the first series of transversely alignable bores of the side plates are so spaced and arranged that the connecting member of the first connecting means can be inserted through only the two alignable bores of the side plates which are in alignment with the appropriate ones of the transversely aligned bores of the first connecting means.

13. The device of claim 6 for use with a precision angle setting device in which each side plate has a transversely alignable slot which is arcuate with respect to the pivot axis and of an extent equal to the number of angular degrees represented by each increment of the second connecting means, the side walls of the component have transversely aligned bores with which the slots are alignable, and a connecting member of a type which can be extended through the slots and bores and then employed to lock the side plates to the first component in a position representing a fraction of a degree.

* * * * *